Aug. 15, 1967
M. S. ROUSH ETAL
3,335,951
THERMOSTAT
Filed July 11, 1966
2 Sheets-Sheet 1
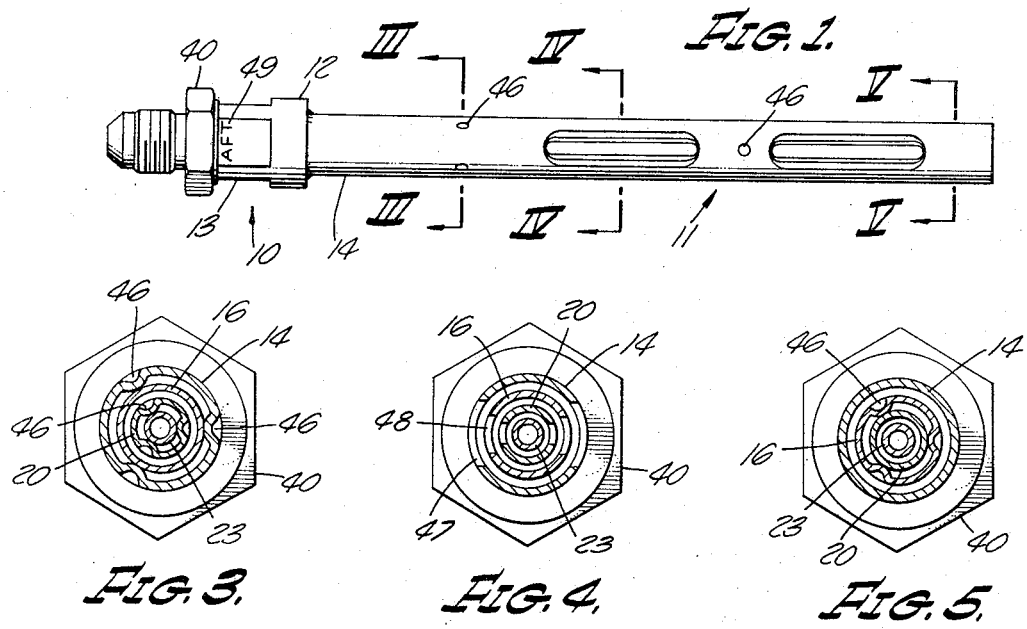
FIG. 1.
FIG. 3.   FIG. 4.   FIG. 5.
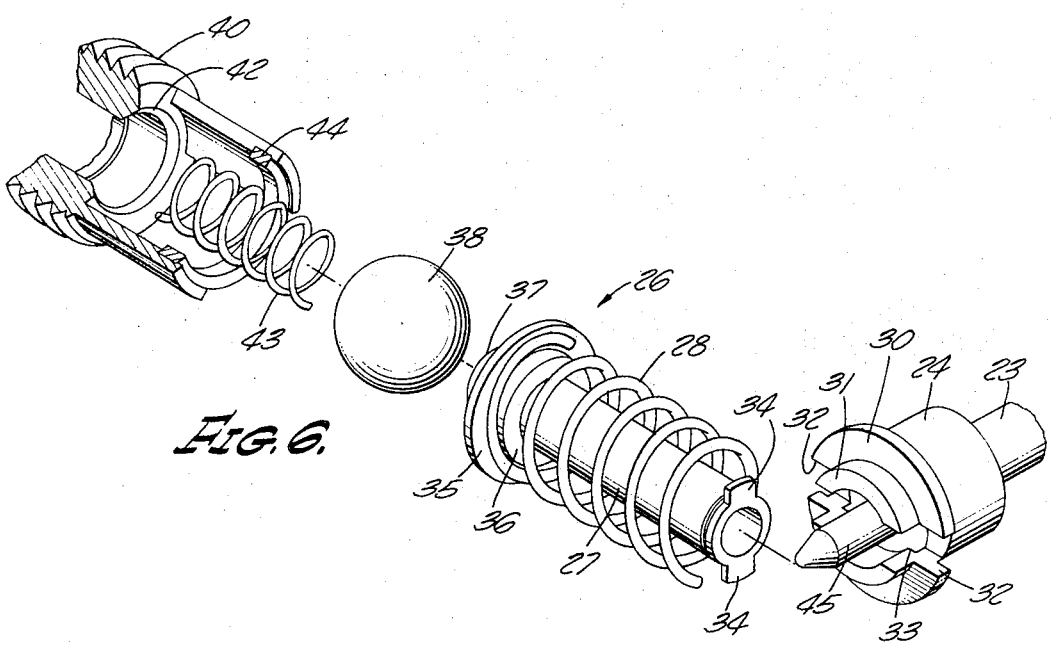
FIG. 6.
INVENTORS
MILTON S. ROUSH
RICHARD O. WASHBURN
DONALD A. NORDAL
BY
Herschel C. Omohundro
ATTORNEY Aug. 15, 1967

M. S. ROUSH ETAL 3,335,951

THERMOSTAT

Filed July 11, 1966

INVENTORS
MILTON S. ROUSH
RICHARD O. WASHBURN
DONALD A. NORDAL

BY

Herschel C. Omohundro

ATTORNEY

United States Patent Office 3,335,951
Patented Aug. 15, 1967

3,335,951
THERMOSTAT
Milton S. Roush and Richard O. Washburn, Phoenix, and Donald A. Nordal, Scottsdale, Ariz., assignors to The Garrett Corporation, Los Angeles, Calif., a corporation of California
Filed July 11, 1966, Ser. No. 564,134
12 Claims. (Cl. 236—87)

This invention relates generally to sensors or signal generators, and more particularly to such devices which are thermoresponsive. Still more particularly, the invention is directed to a thermoresponsive control suitable for use in highly restricted quarters containing flowing, high-temperature fluids.

An object of this invention is to provide a thermoresponsive control which will have a relatively long life, will be highly resistant to vibratory forces, and be so constructed that repair and replacement of certain parts can be accomplished without requiring the removal of the control from its installed position.

A more specific object of this invention is to provide a thermostatic device having a probe composed of a plurality of telescoped elements formed of materials having different coefficients of expansion and so connected that when the device is subjected to predetermined temperature variations, quite extensive relative movement between certain parts will result, even though the overall length of the completed device is restricted.

Another object of the invention is to provide a thermostatic control of the type referred to in the preceding paragraph for use especially in a gas turbine exhaust duct, certain of the elements being constructed to permit the direct engagement of the hot exhaust gases with all of the elements to facilitate rapid response of the device.

It is an object of the invention also to provide a thermostatic control of the type referred to in the two preceding paragraphs further modified to include indicia for properly installing the device in a turbine exhaust duct to insure the attainment of the recited objects.

A still further object is to provide a thermostatic control device of the type mentioned in the preceding objects with novel means for limiting the relative lateral movement between the telescoped elements to preclude faulty operation or premature destruction of parts of the device due to high-frequency vibration resulting from rapidly flowing gases or from mechanical transmission thereto from the turbine.

Another object is to provide a thermostatic control device with valve means to be actuated by the thermoresponsive means, a unique motion-transmitting connection being used between the latter and the valve means, such connection being designed to permit overtravel of the thermoresponsive means after engagement of the valve parts and a dismantling and easy reassembly of the parts for service and repair when required.

Other objects and advantages will be made apparent by the following description of one form of the invention which has been illustrated in detail in the accompanying drawing, in which:

FIG. 1 is a side elevational view of a thermostatic control device formed in accordance with the present invention;

FIGS. 3, 4 and 5 are vertical transverse sectional views taken on planes indicated by lines III—III, IV—IV, and V—V of FIG. 2; and FIG. 6 is an exploded view in perspective of the parts forming a yieldable motion-transmitting connection used in the control device shown in FIG. 1.

Figure 2:
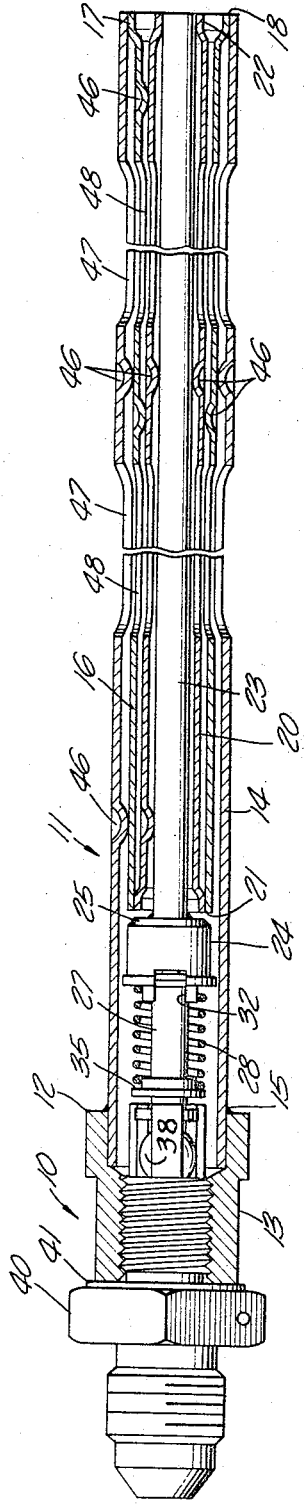
FIG. 2 is a longitudinal sectional view on an enlarged scale of the device shown in FIG. 1.
Figure 2A:
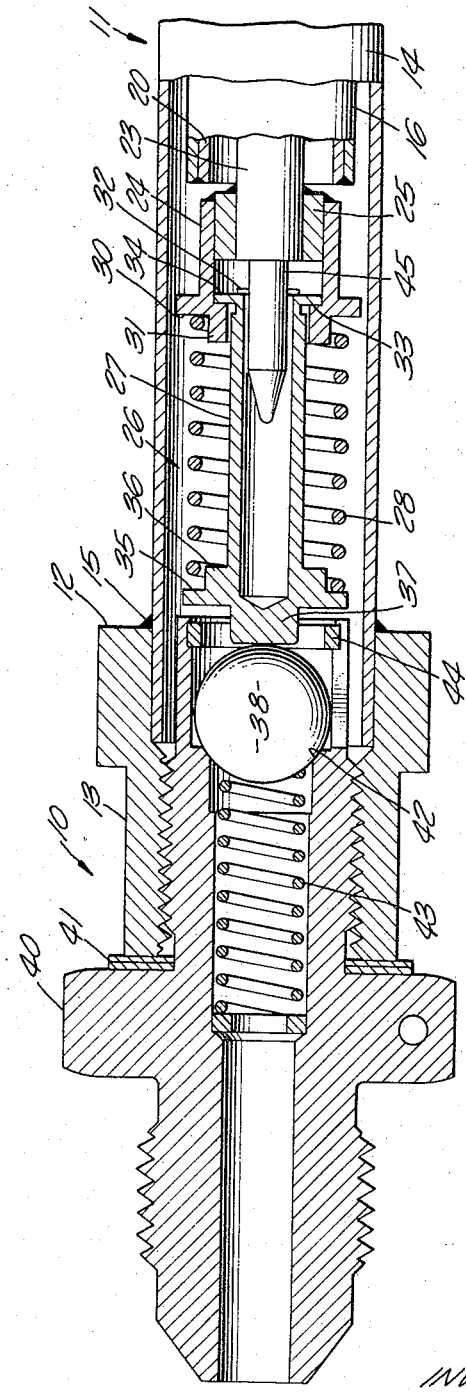
FIG. 2A is a similar view on a further enlarged scale of a portion of the device shown in FIG. 1.

More particular reference to the drawing, and especially FIG. 2 thereof, will show that the thermostatic control illustrated is composed of two main parts: a valve section designated generally by the numeral 10, and a probe section 11. The probe section has a casing assembly 12 including a fitting 13 into which a tube 14 is inserted and secured by welding as at 15. The tube 14 receives a second tube 16 which telescopes it and is substantially coextensive therewith. Tube 16 is expanded at one end as at 17 to closely fit tube 14, and is welded thereto as at 18. Tube 16 receives a third tube 20 which is coextensive with tube 16, tube 20 being expanded at one end and welded as at 21 to the free end of tube 16. Tube 20 telescopes tube 16 and is reduced at one end as at 22 to closely embrace a core 23, this element in the form of the invention shown being a solid rod. It is obvious that, if desired, element 23 could also be tubular.

The end of element 23 welded to tube 20 is counterbored to reduce the thickness to approximately equal the wall thickness of tube 20. This construction is employed to facilitate the welding operation. Core 23 telescopes tube 20 and is provided at the end within the casing with a ferrule 24, a spacer 25 being disposed between the element 24 and the core, these elements all being secured to one another by welding.

As previously mentioned, the tubes and core are made of materials having different coefficients of expansion, tubes 14 and 20 being composed of a material having a low coefficient of expansion, while tube 16 and core 23 are composed of materials having a high coefficient of expansion. Examples of materials found suitable are stabilized stainless steels of different formulas, such as those commercially designated as 446, A286, Incoloy, and others. It will be obvious that due to the selected construction and materials, tube 16 and core 23 will expand under the influence of heat, causing the inner end of the core to move longitudinally in the casing a predetermined extent, depending upon the temperature to which the probe is exposed. This movement is used to actuate valve means in the generation or control of a signal.

The motion of the inner end of the core is transmitted to a valve through a yieldable motion-transmitting connection designated generally by the numeral 26. This motion-transmitting connection includes the ferrule 24, a pusher element 27, and a coil spring 28. The ferrule is constructed to include a shoulder 30 for engagement by the spring 28. The formation of the shoulder provides a spring centering projection 31 which is bifurcated by a slot 32 milled in the end of the ferrule. Also, in the formation of the ferrule it is bored for the reception of the spacer 25, this operation providing an internal shoulder 33. The milling operation which produces the slot 32 reduces the shoulder 33 to two sections, one at each side of the slot. These sections are provided for engagement by tongues 34 formed on one end of the pusher element 27. It will be obvious that when the motion-transmitting connection is assembled, the tongues may be inserted into the slot and moved inwardly in the ferrule, then turned 90 degrees for engagement with the shoulder sections 33. The pusher is formed with a shoulder 35 and a positioning section 36, the latter serving to center the spring 28 when it is abutted with the shoulder 35.

In the operation of assemblying the motion-transmitting connection, the spring is engaged with the shoulders 30 and 35 and compressed as the tongues 34 are inserted into the slot 32. The spring will retain the tongues in engagement with the shoulder sections 33 when the connection is in assembled relationship. The pusher element 27 is formed at the end oposite the tongues with a projection 37 to engage a ball valve 38. This ball valve is disposed in the counterbored end of a fitting 40 which is threaded into the member 13. One or more shims 41 are disposed between opposed portions of the fitting 40 and the element 13 to locate a seat 42, formed in the fitting 40 by the counterboring operation, relative to the casing. The fitting 40 is also bored to form a fluid passage leading to the seat 42. Suitable counterboring is also provided to accommodate a spring 43 which tends to move the ball valve away from the seat. The ball is retained in the fitting by a ring 44. The core 23 is provided with a reduced diameter prong 45 which is received in the open end of the pusher 27 when the assembly of the motion-transmitting connection is initiated. This prong is tapered to further facilitate the connection assembly operation.

It should be obvious from the foregoing description and the drawings that when the probe is heated the elements with the higher coefficient of expansion will increase in length, causing the inner end of the core to move the ferrule toward the valve assembly. This movement will cause the projections 37 to engage the ball 38 and move it in opposition to the force of the spring 43 toward the seat 42. Fluid flow past the seat will thus be controlled. When the seat is engaged by the ball, further movement of the core will merely compress the spring 28 and no damage to the parts will result. It is believed to be obvious that the construction described above provides a normally open valve which will be closed under the influence of increasing exhaust temperature, and also that if a normally closed valve is desired, the arrangement of materials relative to coefficients of expansion will be reversed to cause the valve to open under the influence of increased exhaust temperature.

It has been pointed out in the objects that parts of the probe are constructed to prevent vibration due to the flow of gases or other influences. This object is attained by providing the tubes with dimples 46, or other suitable structural formations, which extend inwardly and engage the next tube or core depending upon the particular element concerned. These dimples are spaced circumferentially around the tubes and are restricted in their depth to limit the amount of surface in engagement so that a minimum of restriction to relative longitudinal movement between the elements will result. It will be noted that the dimples are employed at, or adjacent to, the ends of certain tubes which in the absence of such spacing means would tend to vibrate or otherwise move. Certain of the tubes are provided with the spacing means also at points intermediate the length of the probe where the various parts might tend to vibrate. Also, as pointed out in the objects, the tubes are provided with longitudinally extending sets of slots 47 and 48. The slots in the tubes disposed in surrounding relation to other tubes are made wider so that the inner tubes may be directly engaged by heated fluids flowing past the probe.

It was pointed out previously that the thermostatic device is formed for use particularly in the exhaust duct of a gas turbine. By providing the slots 47 and 48, the inner tubes may be directly contacted by the gas in the same manner that the outer tube is contacted. To further facilitate this gas engagement with the tubes and secure rapid response, the element 13 is provided with indicia 49 (in this instance, the abbreviation AFT) to insure the proper disposition of the probe in the exhaust duct so that openings 47 and 48 will be on the upstream and downstream sides of the probe. The gases flowing through the duct may then enter the slots, flow around the tubes and out of the tubes at the opposite side. A rapid response of the thermostatic control will then result.

It will be obvious that a novel thermostat construction has been provided. The construction of the valve assembly with the resilient motion-transmitting connection permits the valve assembly to be removed without withdrawing the probe from the exhaust duct. The construction of the motion-transmitting connection and the core prevent the engagement of the movable elements of the valve assembly with the casing. Vibration of these elements is also precluded.

We claim:
1. Thermoresponsive control means, comprising:
   (a) tubular casing means formed of a material having a selected coefficient of expansion and adapted to be secured at one end to a support and projected into a region which receives fluids of varying temperature, said casing having a signal fluid passage with a valve seat;
   (b) a second tube formed of a material having a relatively different coefficient of expansion secured at one end to the free end of said casing and telescoping the same;
   (c) a third tube formed of a material having a coefficient of expansion similar to that of said casing means secured at one end to the other end of said second tube and telescoping the same;
   (d) a core formed of a material having a coefficient of expansion similar to that of the second tube secured at one end to the other end of said third tube and projecting through the same;
   (e) a valve element disposed for cooperation with the seat in the fluid passage in said tubular casing to control fluid flow through such passage; and
   (f) a motion-transmitting, yieldable connection between the other end of said core and said valve element.

2. The thermoresponsive control means of claim 1 in which certain of the tubes are formed with means for spacing them from one another and said core to minimize relative vibratory movement.

3. The thermoresponsive control means of claim 1 in which certain of the tubes are provided at points spaced longitudinally and circumferentially thereof with means to space them from one another and said core to minimize relative vibratory movement therebetween with a minimum of resistance to relative longitudinal movement.

4. The thermoresponsive control means of claim 1 in which the diameter of certain of the tubes are changed at the ends to closely fit adjacent tubes and core prior to being secured thereto by fusion welding.

5. The thermoresponsive control means of claim 1 in which the casing means and tubes are provided with slots of predetermined length and width to permit fluids to contact internal structure of the control means at a selected rate.

6. The thermoresponsive control means of claim 1 in which the casing means and tubes are provided with axially extending slots of predetermined length and width to permit fluids to contact internal structure of the control means at a selected rate.

7. The thermoresponsive control means of claim 1 in which the casing means and tubes are provided with spaced sets of axially extending slots of predetermined length and width to permit fluids to contact internal structure of the control means at a selected rate and certain of the tubes are formed in the space between the sets of slots and at the ends thereof with means to space the tubes from one another and said core to minimize relative vibratory movement therebetween.

8. The thermoresponsive control means of claim 6 in which indicia is provided on the casing means to be exposed to view from the exterior of the region in which the casing means projects to show the positions of the slots.

9. The thermoresponsive control means of claim 1 in which said motion-transmitting, yieldable connection has a valve pusher element, an adapter element secured to the end of said core, and resilient means between said valve pusher element and said adapter element.

10. The thermoresponsive control means of claim 9 in which said valve pusher and adapter elements have means for limiting relative separation thereof by said resilient means.

11. The thermoresponsive control means of claim 10 in which the means for limiting separation of said valve pusher and adapter elements is constructed to provide for the separation thereof and removal of said resilient means.

12. The thermoresponsive control means of claim 11 in which the core of said control means is provided with means for guiding said valve pusher into place on reassembly.

References Cited

UNITED STATES PATENTS

| | | | |
|---|---|---|---|
| 809,941 | 1/1906 | Glockler | 236—102 |
| 832,620 | 10/1906 | Noyes | 236—87 |
| 1,726,068 | 8/1929 | Hoeschen | 236—102 X |
| 2,565,713 | 8/1951 | Allen | 236—87 X |
| 3,014,664 | 12/1961 | Meyer | 236—81 |

WILLIAM J. WYE, *Primary Examiner.*